US012651287B2

(12) United States Patent
Batie et al.

(10) Patent No.: US 12,651,287 B2
(45) Date of Patent: Jun. 9, 2026

(54) METHODS AND SYSTEMS FOR PARTICIPATION IN A VEHICLE MARKETPLACE

(71) Applicant: Toyota Motor North America, Inc., Plano, TX (US)

(72) Inventors: Joshua Batie, Frisco, TX (US); Michael Tripp, Plano, TX (US); Tyler Brown, Dallas, TX (US); Brian Kursar, Fairview, TX (US)

(73) Assignees: Toyota Motor North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 450 days.

(21) Appl. No.: 18/113,879

(22) Filed: Feb. 24, 2023

(65) Prior Publication Data

US 2024/0289859 A1 Aug. 29, 2024

(51) Int. Cl.
*G06Q 30/0601* (2023.01)
*G06Q 30/02* (2023.01)
*G07C 5/06* (2006.01)

(52) U.S. Cl.
CPC ..... *G06Q 30/0631* (2013.01); *G06Q 30/0278* (2013.01); *G07C 5/06* (2013.01)

(58) Field of Classification Search
None
See application file for complete search history.

(56) References Cited

U.S. PATENT DOCUMENTS 10,528,989 B1 * 1/2020 Irey .................... G07C 5/008
11,107,104 B1 8/2021 Brannan et al.
11,126,931 B1 9/2021 Price et al.
12,125,106 B1 * 10/2024 Gallagher ............. G06Q 40/08
2014/0058805 A1 2/2014 Paesler et al.
(Continued)

FOREIGN PATENT DOCUMENTS

EP 3133545 A1 2/2017

OTHER PUBLICATIONS

A. Ifthikar and K. Vidanage, "Valuation of Used Vehicles: A Computational Intelligence Approach," 2018 8th International Conference on Intelligent Systems, Modelling and Simulation (ISMS), Kuala Lumpur, Malaysia, 2018, pp. 7-10, doi: 10.1109/ISMS2018. 00011. (Year: 2018).*

*Primary Examiner* — Michelle T Kringen

(74) *Attorney, Agent, or Firm* — Dinsmore & Shohl LLP

(57) ABSTRACT

A system and method for generating recommendations of a vehicle corresponding to a driver's driving behavior includes receiving driving behavior data of the vehicle, receiving data related to ownership of the vehicle, receiving vehicle sales market data, generating an asset valuation, generating a recommendation to a user, and providing the recommendation to the user through a user device. The driving behavior data is generated from vehicle sensors and is received with one or more processors communicatively coupled to a vehicle. A trained machine-learning model is implemented by the one or more processors and generates an asset valuation. The trained machine-learning model generates a recommendation to a user based on the asset valuation and the driving behavior data. The recommendation includes a new or used vehicle for purchase or leasing. The recommendation is provided to a user though a user device.

19 Claims, 5 Drawing Sheets

500

| DRIVING BEHAVIOR SCORE (322) | OWNERSHIP DATA (OWN OR LEASE) (109) | RECOMMENDATION (262) |
|---|---|---|
| > Predetermined Threshold | Own | purchase new vehicle |
| < Predetermined Threshold | Own | recommend service |
| > Predetermined Threshold | Lease | recommend new vehicle |
| < Predetermined Threshold | Lease | Recommend purchase lease car |

(56) References Cited

U.S. PATENT DOCUMENTS

| | | | |
|---|---|---|---|
| 2014/0222820 A1* | 8/2014 | Mott | G06Q 10/087 |
| | | | 707/740 |
| 2016/0371977 A1 | 12/2016 | Wingate et al. | |
| 2019/0095963 A1* | 3/2019 | Martin | G06Q 10/20 |
| 2020/0380574 A1 | 12/2020 | Kennedy | |
| 2024/0177534 A1* | 5/2024 | Madden | G06Q 50/40 |
| 2024/0280368 A1* | 8/2024 | Quint | G01C 21/3691 |

* cited by examiner

500

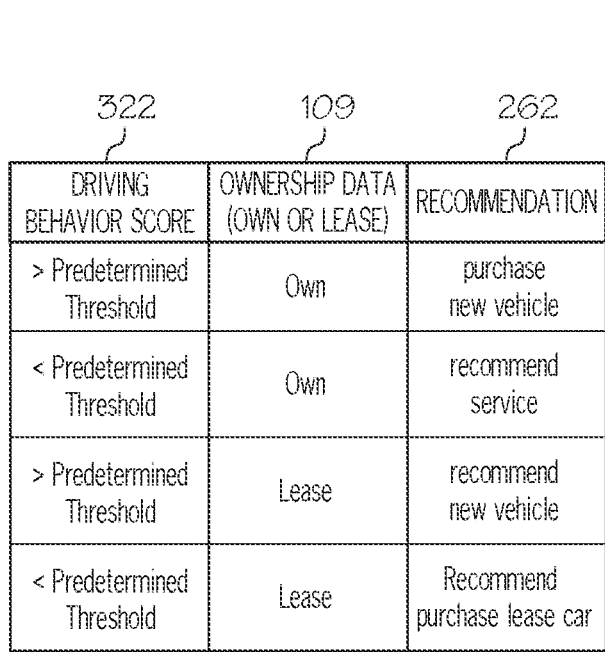

| DRIVING BEHAVIOR SCORE | OWNERSHIP DATA (OWN OR LEASE) | RECOMMENDATION |
|---|---|---|
| > Predetermined Threshold | Own | purchase new vehicle |
| < Predetermined Threshold | Own | recommend service |
| > Predetermined Threshold | Lease | recommend new vehicle |
| < Predetermined Threshold | Lease | Recommend purchase lease car |

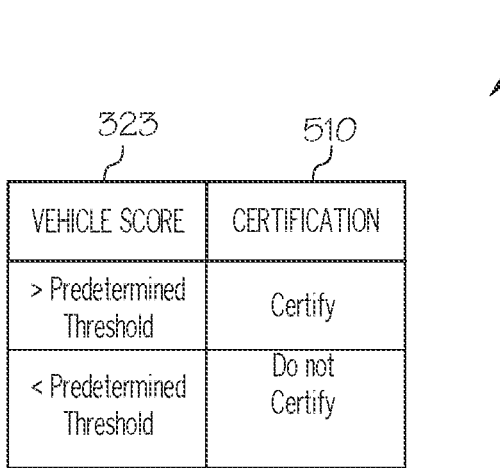

| VEHICLE SCORE | CERTIFICATION |
|---|---|
| > Predetermined Threshold | Certify |
| < Predetermined Threshold | Do not Certify |

METHODS AND SYSTEMS FOR PARTICIPATION IN A VEHICLE MARKETPLACE

TECHNICAL FIELD

The present specification relates to methods and systems for participation in a vehicle marketplace and, more specifically, to methods and systems for utilizing vehicle data to generate and provide a recommendation for vehicle purchase, leasing or services.

BACKGROUND

Vehicles are often purchased or leased on a platform or website where an individual and/or dealers can buy and sell vehicles. These include new and used cars, trucks, motorcycles, boats and other types of vehicles. Users may not know what vehicle is the best fit, offers the best financing, or includes the best services and/or options. Additionally, dealers do not know how the user's current vehicle is driven to accurately recommend a vehicle or financing options. As the level of sophistication of systems and sensors within the vehicle improve, users can access real time asset value information and recommendations.

Accordingly, a need exists for a system and method for encouraging participation in a vehicle marketplace by providing real time asset valuation and recommendations.

SUMMARY

In one embodiment, a method for generating recommendations of a vehicle corresponding to a driver's driving behavior including receiving driving behavior data of the vehicle, receiving data related to ownership of the vehicle, receiving vehicle sales market data, generating an asset valuation, generating a recommendation to a user, and providing the recommendation to the user through a user device. The driving behavior data is generated from vehicle sensors and is received with one or more processors communicatively coupled to a vehicle. A trained machine-learning model implemented by the one or more processors generates, based on the vehicle sales market data, the driving behavior data, and the data related to ownership of the vehicle, an asset valuation. The trained machine-learning model generates a recommendation to a user based on the asset valuation and the driving behavior data. The recommendation includes a new or used vehicle for purchase or leasing. The recommendation is provided to a user though a user device.

In another embodiment, a system includes a computing device, a transceiver unit, machine readable instruction set. The computing device has a processor and a non-transitory computer readable memory. The transceiver unit communicatively is coupled to the computing device. The machine-readable instruction set is stored in the non-transitory computer readable memory and causes the system to perform at least the following when executed by the processor: receive driving behavior data of a vehicle generated from vehicle sensors; receive data related to ownership of the vehicle; receive vehicle sales market data; generate, using a trained machine-learning model implemented by the processor, based on the vehicle sales market data, the driving behavior data, and the data related to ownership of the vehicle, an asset valuation; generate, with the trained machine-learning model, a recommendation to a user based on the asset valuation and the driving behavior data, wherein the recommendation comprises a new or used vehicle for purchase or leasing; and provide the recommendation to a user though a user device.

In yet another embodiment, a vehicle includes a computing device, a transceiver unit, machine readable instruction set. The computing device has a processor and a non-transitory computer readable memory. The transceiver unit communicatively is coupled to the computing device. The machine-readable instruction set is stored in the non-transitory computer readable memory and causes the system to perform at least the following when executed by the processor: receive driving behavior data of a vehicle generated from vehicle sensors; receive data related to ownership of the vehicle; receive vehicle sales market data; generate, using a trained machine-learning model implemented by the processor, based on the vehicle sales market data, the driving behavior data, and the data related to ownership of the vehicle, an asset valuation; generate, with the trained machine-learning model, a recommendation to a user based on the asset valuation and the driving behavior data, wherein the recommendation comprises a new or used vehicle for purchase or leasing; and provide the recommendation to a user though a user device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5A depicts a chart illustrating recommendations based on associated driving behavior scores and ownership data according to one or more embodiments shown and described herein;

FIG. 5B depicts a chart illustrating example certification determinations based on the vehicle score according to one or more embodiments shown and described herein;

DETAILED DESCRIPTION

Figure 1:
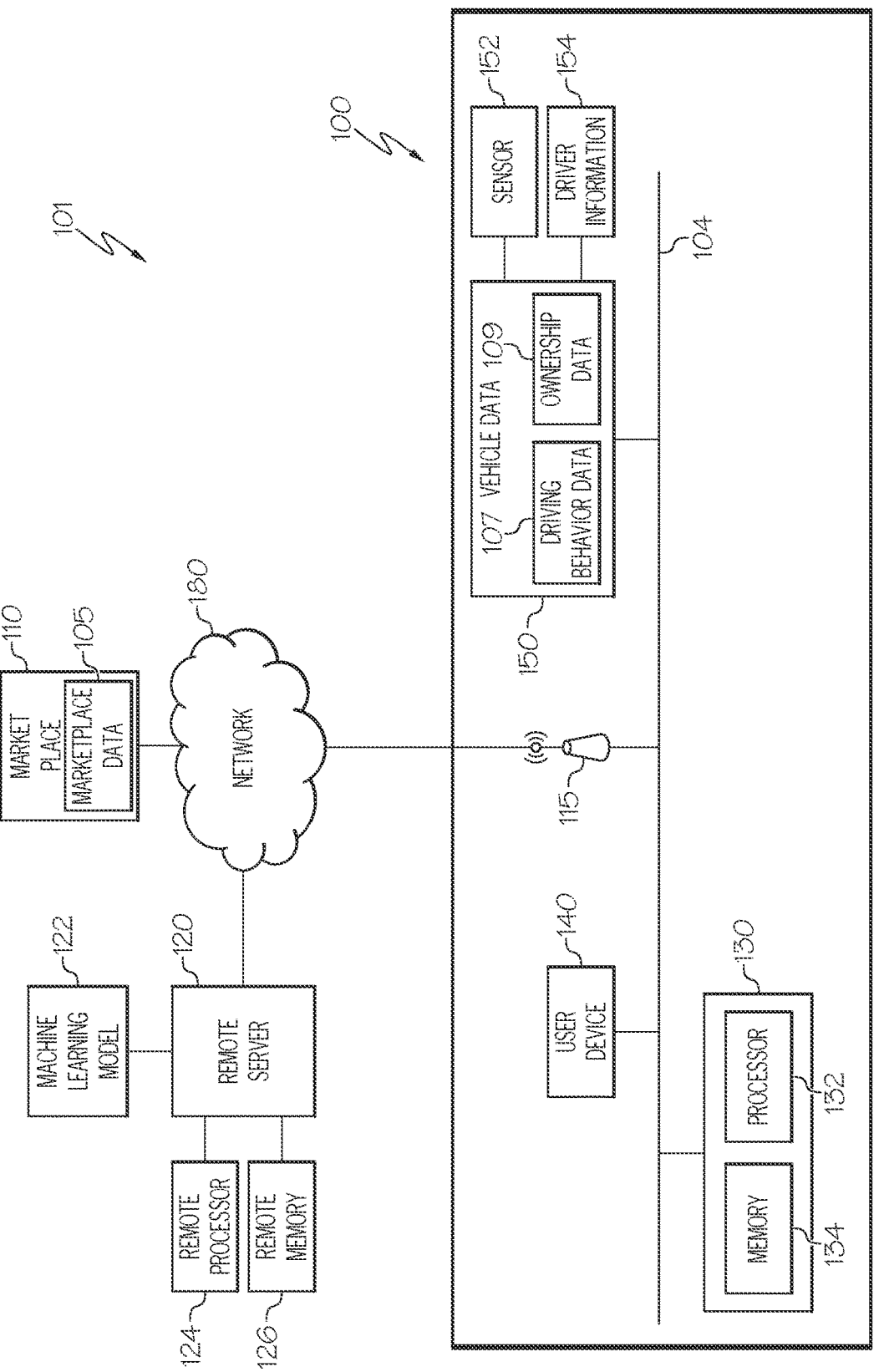
FIG. 1 schematically depicts an illustrative system diagram of a vehicle marketplace system according to one or more embodiments shown and described herein.

Embodiments of the present disclosure are directed to generating and providing messages through a vehicle head unit or a user device to encourage participation in a vehicle marketplace. The system collects data generated from vehicle sensors, data relating to ownership of the vehicle, and vehicle sales market data. This data is then analyzed using a machine-learning model trained to make recommendations for other vehicles or services that may be more suitable for the owner.

In some embodiments, the system may also provide a process for generating driving behavior scores and vehicle scores for virtually verifying and certifying a vehicle for purchase. This can be used by dealer groups, business-to-consumers (B2C) sales, and for private sales. Additionally, the system may be used for rideshare companies to indicate, for example, how well maintained the vehicle may be and how the rideshare driver drives the vehicle. For example, the vehicle score may indicate that the vehicle is well maintained, serviced on a regular schedule, and/or the frequency and severity of accidents the vehicle has been involved in. That is, in some embodiments, there may be one overall vehicle score, but many sub-scores that correspond to features such as the aforementioned. Furthermore, the driving behavior score, which is generated from vehicle sensor data collected by vehicle sensors and analyzed, for example, by the trained machine-learning mode described herein, provides a rideshare user with information about their prospective rideshare driver. For example, the information may indicate whether the driver is an aggressive driver, defensive driver, a rule abiding driver, and/or the like.

As will be described in more detail herein, in some embodiments, the systems and methods may implement a machine-learning model that is configured to learn one or more conditions and/or sequences of conditions for generating a recommendation of a vehicle for purchase or lease that corresponds to a driver's driving behavior. The machine-learning model may be a neural network model or other type of model including, for example, a deep-learning model. Once trained, the machine-learning model ingests vehicle sensor data from the vehicle sensors, driver's information (e.g., information regarding the ownership of their current vehicle such as the make and model, whether the vehicle is leased or not, whether the vehicle was pre-owned or new to the owner, demographic information, a driver's driving record, or the like), and vehicle sales market data (e.g., including vehicle specifications, vehicle performance attributes such as acceleration, braking, towing capacity, fuel efficiency, and the like, and other sales market data such as price, estimate future service expenses, available warranties and the like). With the ingested information, the machine-learning model is configured (e.g., through a training process) to generate recommendations for a new or used vehicle for purchase or lease by a user. In some embodiments, the recommendations may also include recommended services, warranties, and/or options for the vehicle. In embodiments, the machine-learning model incorporates vehicle ownership data for a vehicle currently owned by a user in the analysis, for example, including hundreds of disparate data points such as environmental information pertaining to where the vehicle was stored and operated, driving behavior data pertaining to how the vehicle was driven, service and maintenance data, and the like. This allows the machine-learning model to generate a vehicle valuation of the owner's current vehicle and make a recommendation to the user for a new, optionally pre-owned or newly manufactured vehicle, in the vehicle marketplace.

Embodiments of the present disclosure are directed to systems and methods for encouraging participation in the vehicle marketplace by providing specific recommendations to a user device or vehicle head display based on user specific vehicle data. The following will now describe these systems and methods in more detail with reference to the drawings and where like numbers refer to like structures.

FIG. 1 generally depicts a schematic illustration of the system 101 according to the present embodiments. The system 101 includes a vehicle 100, a remote server 120, a vehicle marketplace 110, and a user device 140 communicatively coupled, for example, through a network 180. The vehicle 100 includes one or more computing devices 130 connected through the communication path 104 and a network 180. The vehicle 100 depicted in FIG. 1 includes a computing device 130. The computing device 130 includes a processor 132 and a memory 134. The vehicle 100 further includes a user device 140 and vehicle data 150, for example, stored in a memory component. The vehicle data 150 includes driving behavior data 107 and ownership data 109 which is data related to the ownership of the vehicle 100. Vehicle sensor data generated by the various vehicle sensors 152 and driver information 154 are analyzed by the processes described herein to generate subsets of the vehicle data 150 including the driving behavior data 107 and ownership data 109. The vehicle 100 is connected to the network 180 with a transceiver 115. The remote server 120 may also be connected to the network 180 and includes a machine-learning model 122, a remote processor 124 and a remote memory 126. In addition, a vehicle marketplace 110 is connected to the network 180.

The vehicle 100 of FIG. 1 includes a communication path 104. The communication path 104 provides data interconnectivity between various components of the vehicle 100. Specifically, each of the components can operate as a node that may send and/or receive data. In some embodiments, the communication path 104 includes a conductive material that permits the transmission of electrical data signals to processors 132, memories 134, sensors 152, and actuators throughout the vehicle 100. In another embodiment, the communication path 104 can be a bus, such as, for example, a LIN bus, a CAN bus, a VAN bus, and the like. In further embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

The computing device 130 may be any device or combination of components comprising a processor 132 and non-transitory computer readable memory 134. The processor 132 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the vehicle 100 by the communication path 104. Accordingly, the communication path 104 may communicatively couple any number of processors 132 with one another, and allow the components coupled to the communication path 104 to operate in a distributed computing environment. Specifically, each of the components may operate as a node that may send and/or receive data. While the embodiment depicted in FIG. 1 includes a single processor 132, other embodiments may include more than one processor 132.

The memory 134 is a non-transitory computer readable memory component comprising RAM, ROM, flash memories, hard drives, or any other non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the vehicle 100 of system 101 depicted in FIG. 1 includes a single non-transitory computer readable memory 134, other embodiments may include more than one memory module.

The vehicle data 150 may reside local to and/or remote from the vehicle 100 and may be configured to store one or more pieces of data (e.g., driving data, environment information, known conditions, driver information and/or salient portions of the environment) for access by components of the system 101. As illustrated in FIG. 1, the vehicle data 150 stores, for example, driving behavior data 107 that may include vehicle sensor data from one or more sensors 152 recorded during past driving events, as described below. Additionally, the vehicle data 150 may include ownership data 109 related to the ownership of the vehicle 100 which may also include data gathered from sensors 152 and driver information 154. The vehicle data 150 may be communicatively coupled to the computing device 130 through the communication path 104.

The driving behavior data 107 may be generated from vehicle sensor data or signals from the vehicle sensors 152. The vehicle sensors 152 include, for example, but without limitation, one or more proximity sensors, one or more microphones, one or more cameras, infrared light emitters and detectors, a global positioning system (GPS), weather sensors, speed sensors, steering wheel sensors, LIDAR systems, and the like. These sensors, as described in detail below, are capable of collecting data such as acceleration data, braking data, steering data, brake usage, lane departure events, routes driven, time, location, fuel consumption, idling time, distance traveled, occurrences of an accident, historical location data, and the like. In some embodiments, the driving behavior data 107 further includes an indication of the number of occupants in a vehicle and/or the frequency of occupants in addition to the driver for driving trips.

A proximity sensor may be any device or combination of components capable of outputting a signal indicative of the presence or absence of an object within or near the vehicle 100. The proximity sensor may also be a sensor capable of determining a range or distance to an object, for example the distance from the vehicle 100 and another vehicle that is traveling in front of the vehicle 100. In some embodiments, one or more proximity sensors may be configured to enable an around view monitoring system for the vehicle 100.

A microphone may be any device capable of transforming a mechanical vibration associated with sound into an electrical signal indicative of the sound. In embodiments, the microphone may be used to monitor sound levels for purposes such as determining the existence of traffic. In other embodiments, the microphone may be used to monitor words spoken within the vehicle that may indicate desires of a driver. The one or more cameras may enable a variety of different monitoring, detection, control, and/or warning systems within a vehicle 100. The one or more cameras may be any device having an array of sensing devices (e.g., a CCD array or active pixel sensors) capable of detecting radiation in an ultraviolet wavelength band, a visible light wavelength band, or an infrared wavelength band.

A global positioning system, or GPS, may be coupled to the communication path 104 and communicatively coupled to the computing device 130 of the vehicle 100. The GPS is capable of generating location information indicative of a location of the vehicle 100 by receiving one or more GPS signals from one or more GPS satellites. The GPS signal communicated to the computing device 130 via the communication path 104 may include location information comprising a National Marine Electronics Association (NMEA) message, a latitude and longitude data set, a street address, a name of a known location based on a location database, or the like. Additionally, the GPS may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

Weather sensors may be temperature sensors, precipitation gauges, wind meters, UV light sensors, or the like. The weather sensors may be coupled to the communication path 104 and communicatively coupled to the computing device 130. The weather sensors may be any device capable of outputting a signal indicative of a weather condition such as a temperature level, the presence or an amount of precipitation, the direction and/or speed of the wind, the presence and/or intensity of sunlight or the like.

A vehicle speed sensor may be any sensor or system of sensors for generating a signal indicative of vehicle speed. For example, without limitation, a vehicle speed sensor may be a tachometer that is capable of generating a signal indicative of a rotation speed of a shaft of the vehicle 100 engine or a drive shaft. In some embodiments, the vehicle speed sensor comprises an opto-isolator slotted disk sensor, a Hall Effect sensor, a Doppler radar, or the like. The vehicle speed sensor may be provided so that the computing device 130 may determine when the vehicle 100 accelerates, maintains a constant speed, slows down or is comes to a stop.

A steering wheel sensor system may comprise a plurality of sensors located in the steering wheel for determining a driver grip on the steering wheel, the degree of rotation applied to the steering wheel or the forces applied in turning or maintaining the steering wheel. The steering wheel sensor system may provide signals to the computing device 130 indicative of the location and number of hands on the steering wheel, the strength of the grip on the steering wheel, or changes in position of one or more hands on the steering wheel. The steering wheel sensor system, for example, without limitation, may include pressure sensors, inductive sensors, optical sensors, or the like. In addition to detecting the location, number, grip, and change in position of one or more hands on the steering wheel, the steering wheel sensor system may also include one or more sensors indicating the rotational angle of the steering wheel and provide corresponding signals to the computing device 130.

A LIDAR system or light detection and ranging is a system and method of using pulsed laser light to measure distances from the LIDAR system to objects that reflect the pulsed laser light. In embodiments, the LIDAR systems can be used by vehicles 100 to provide detailed 3D spatial information for the identification of objects near a vehicle 100, as well as the use of such information in the service of systems for vehicular mapping, navigation and autonomous operations, especially when used in conjunction with geo-referencing devices such as GPS or a gyroscope-based inertial navigation unit or related dead-reckoning system.

The ownership data 109 related to the ownership of the vehicle 100 may be generated from vehicle sensors 152 and driver information 154. Ownership data 109 related to ownership of a vehicle 100 may include the vehicle identification number (VIN), make and model, year, color, license plate number, registration information, and insurance information. In embodiments, it may also include information about the current owner, such as their name, address, and contact information. In some cases, it may also include information about previous owners and any accidents or damage the vehicle 100 has been involved in. This data may be gathered through user input, which may be made in some embodiments through a user device 140.

In embodiments, the vehicle data 150, including both the driving behavior data 107 and the ownership data 109, may also be gathered through information available in the vehicle marketplace 110, gathered by vehicle sensors 152, or any other source of data connected to the vehicle through the network 180 or communication path 104.

Still referring to FIG. 1, the vehicle 100 may include an associated user device 140. A user device 140 of the vehicle 100 is a device or technology that can be used in a vehicle 100 to provide various functions and services to the user. In embodiments, these devices can be installed in the vehicle 100, connected to the computing device 130 of the vehicle 100 and/or communicate directly or wirelessly via the communication path 104. Some examples of vehicle user devices include, in-vehicle infotainment systems (IVI), heads-up displays (HUD), rear-seat entertainment systems, smartphone integration systems, and/or the like. In some embodiments, the user device 140 may be a smartphone, laptop or other personal electronic device communicatively coupled to the vehicle 100. These devices can be used for a variety of purposes such as navigation, entertainment, communication, and vehicle management. In embodiments, the user device 140 may be used to provide vehicle data 150 in addition to providing recommendations 262 (FIG. 5A) to the user. Further, the user device 140 may be communicatively coupled to the other components of the system 101 through the network 180, the transceiver 115, or the communication path 104.

The transceiver 115 is coupled to the communication path 104 of the vehicle 100 and communicatively coupled to the computing device 130 (e.g., the processor 132 and the memory 134). The transceiver 115 may be any device capable of transmitting and/or receiving data via a network 180. Accordingly, transceiver 115 can include a communication transceiver 115 for sending and/or receiving any wired or wireless communication. For example, the transceiver 115 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the transceiver 115 includes hardware configured to operate in accordance with the Bluetooth wireless communication protocol. In another embodiment, the transceiver 115 may include a Bluetooth send/receive module for sending and receiving Bluetooth communications to/from a network 180.

The network 180 may include one or more computer networks (e.g., a personal area network, a local area network, or a wide area network), cellular networks, satellite networks and/or a global positioning system and combinations thereof. Accordingly, the vehicle 100, the remote server 120 and/or the vehicle marketplace 110 may be communicatively coupled to each other through the network 180 via wires or wireless technologies, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

A remote server 120 may be connected to the network 180 and be configured to communicate between the vehicle marketplace 110 and the vehicle 100. The remote server 120 may be any device or combination of components comprising a remote processor 124 and non-transitory computer readable remote memory 126. The remote processor 124 may be any device capable of executing the machine-readable instruction set stored in the non-transitory computer readable remote memory 126. Accordingly, the remote processor 124 may be an electric controller, an integrated circuit, a microchip, a computer, or any other computing device.

The non-transitory computer readable remote memory 126 may comprise RAM, ROM, flash memories, hard drives, or any non-transitory memory device capable of storing machine-readable instructions such that the machine-readable instructions can be accessed and executed by the remote processor 124. The machine-readable instruction set may comprise logic or algorithm(s) written in any programming language of any generation (e.g., 1GL, 2GL, 3GL, 4GL, or 5GL) such as, for example, machine language that may be directly executed by the remote processor 124, or assembly language, object-oriented programming (OOP), scripting languages, microcode, etc., that may be compiled or assembled into machine readable instructions and stored in the non-transitory computer readable remote memory 126. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

The remote server 120 is configured to implement a machine-learning model 122. The machine-learning model 122 is a system that can learn from inputs and make predictions or decisions therefrom. Machine-learning models 122 are trained using a dataset. In embodiments, the machine-learning model 122 is configured to be trained using data transmitted through the network 180 to the remote server 120. The data includes, but is not limited to the driving behavior data 107, ownership data 109 related to the ownership of the vehicle 100, and vehicle sales market data 105. The machine-learning model 122 may be a supervised learning models, unsupervised learning models, semisupervised learning models, reinforcement learning models, deep learning models generative models, transfer learning models, neural networks or the like. In embodiments, the remote server 120 is configured to implement the machine-learning model 122 that ingests input data and generates a recommendation 262 (FIG. 5A). It should be understood that this process may be completed by any processor 124, 132, including one or more computing devices 130 communicatively coupled to the vehicle 100.

The machine-learning model 122 can be one of a variety of models and algorithms. The following list of models is merely an example. The machine-learning model 122 implemented in the present embodiments may be a supervised learning model, an unsupervised learning model, a semisupervised learning model, a reinforcement learning model, a deep learning model, a generative model, an adversarial network, a variational auto encoder, or the like.

Referring still to FIG. 1, the vehicle marketplace 110 is communicatively coupled to the vehicle 100 and the remote server 120 through the network. A vehicle marketplace 110 may be a platform or website implemented by a computing device where users and dealers can buy and sell vehicles, lease vehicles, or receive other services related to vehicles. These services may be warranties, maintenance, detailing, aftermarket accessories or the like. The marketplace typically provides a user-friendly interface for browsing and searching for vehicles, as well as tools for listing vehicles for sale, managing and communicating with buyers, and completing transactions. The vehicle sales marketplace may include vehicle sales market data 105. In embodiments, this data includes vehicle information, owner information, pricing information, images, reviews, ratings, inventory, location, vehicle history reports, and the like. Further, the vehicle marketplace 110 may include data on vehicle insurance, warranty plans, financing and more. The vehicle sales market data 105 may be supplied as an input to the machine-learning model 122 through the network 180.

Figure 2:
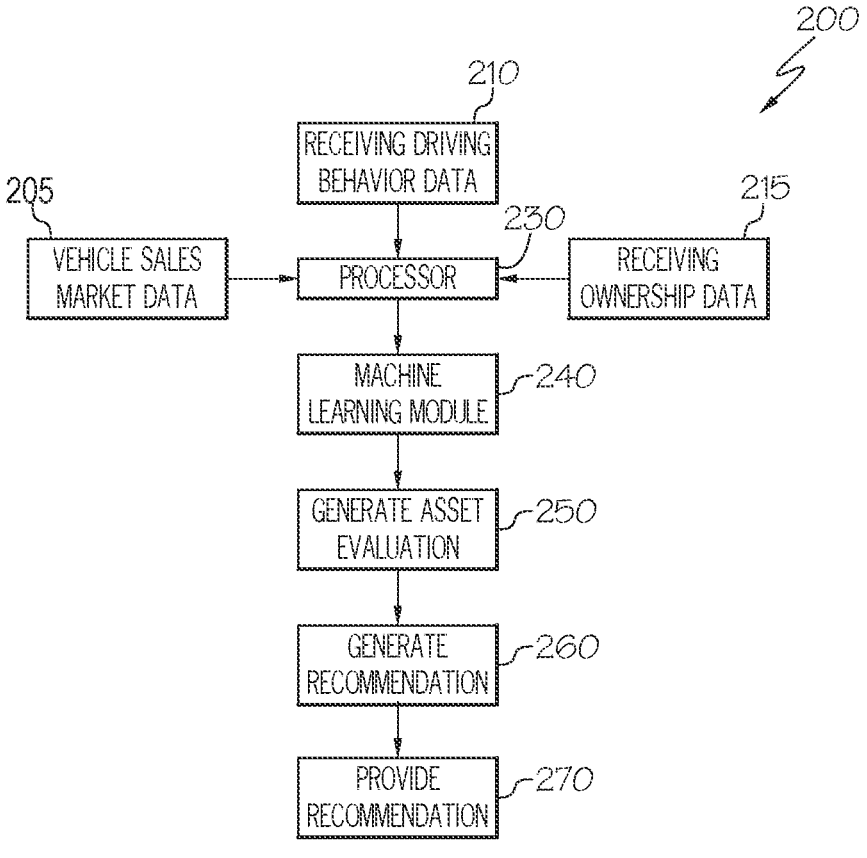
FIG. 2 depicts a flowchart of an example method for a providing a recommendation in a vehicle marketplace system according to one or more embodiments shown and described herein.

Now referring to FIG. 2, a flowchart 200 of an example method for a providing a recommendation 262 (FIG. 5A) in a vehicle marketplace system is depicted. As described above, the method may be carried out by a computing device 130 of a vehicle 100, a remote server 120, or a combination of both. The flowchart 200 depicted in FIG. 2 is a representation of a machine-readable instruction set stored in the non-transitory computer readable memory 134, or remote memory 126 and executed by the processor 132 or remote processor 124 of a computing device 130 or a remote server 120. The process of the flowchart 200 in FIG. 2 may be executed at various times and in response to inputs or other signals from a user device 140 communicatively coupled to the computing device 130 or the remote server 120. In other embodiments, the process of the flowchart 200 may be executed as directed by a remote server 120 (e.g., generally referred to herein as a computing device) without the input of a user. The following method will be described with reference to implementation and execution by a computing device.

At block 205, vehicle sales market data 105 may be retrieved from a vehicle marketplace 110, by a computing device (e.g., a remote server 120 or a computing device 130). At block 210, driving behavior data 107 is retrieved from the vehicle 100 through the vehicle sensors 152 by the computing device. At block 215, ownership data 109 is retrieved by the computing device. The ownership data 109 may be retrieved from the vehicle marketplace 110 or the vehicle 100. In addition, the data may come from any other source connected to the network 180. At block 230, the retrieved data is transmitted through the network 180 or other communication pathways to a processor (e.g., a processor 132 of the computing device 130 of the vehicle 100 or the remote processor 124 of the remote server 120, or a combination of both. The one or more processors 124, 132 then implement the machine-learning model 122.

At block 240, the machine-learning model 122 is trained, as described above, with training data, including the vehicle sales market data 105, the driving behavior data 107, the ownership data 109 and other related data. At block 250, the machine-learning model 122, implemented by the computing device 130 or the remote server 120, generates an asset valuation. The asset valuation is a report on the value of an owner's current vehicle 100 that includes a market value, a private sale value, a depreciated value, an intrinsic value, a salvage value or other value of the owner's current vehicle. These may include the current price based on market conditions, the original cost of the vehicle 100 including additional costs of maintenance and repairs, the value based on depreciation over time, the value to the owner based on the vehicle's 100 inherent characteristics, use as earning potential, or the value of the used parts of the vehicle 100.

At block 260, a recommendation 262 (FIG. 5A) is generated by the machine-learning model 122 based on the determined asset valuation, driving behavior data 107 of the user's current vehicle, and the ownership data 109 of the user's current vehicle. In embodiments, the recommendation 262 includes at least one of a recommendation of a new or used vehicle for purchase, a leasing option, or a service provided to a vehicle. Further, in some embodiments when the recommendation 262 includes a purchase of a new or used vehicle, the recommendation 262 may define attributes of the new or used vehicle such as whether the vehicle is a truck, an SUV, a sedan, an electric vehicle, a hybrid vehicle, or the like. Additionally, the recommendation 262 may define features of the vehicles such as engine, towing package, transmission configuration, or the like. Each of these recommendations are generated by the machine-learning model's 122 analysis of the driving behavior data 107 of the user's current vehicle 100 and the ownership data 109 of the user's current vehicle 100. Methods for determining the driving behavior score 322 and/or a vehicle score 323 of the owner's current vehicle 100 based on the driving behavior data 107 of the user's current vehicle 100 and the ownership data 109 of the user's current vehicle 100 which are used by the machine-learning model 122 to make the recommendation 262 to a user will be described in more detail herein. In embodiments when the recommendation 262 includes a tailored leasing options, the recommendation 262 defines financing options, terms, conditions, buyback offers, purchasing options, or the like. In embodiments when the recommendation 262 includes a service, the recommendation 262 defines warranties, maintenance packages, accessories, software, upgrades or the like that should be offered to the user based at least on the driving behavior of the user in their current vehicle 100.

Figure 6A:
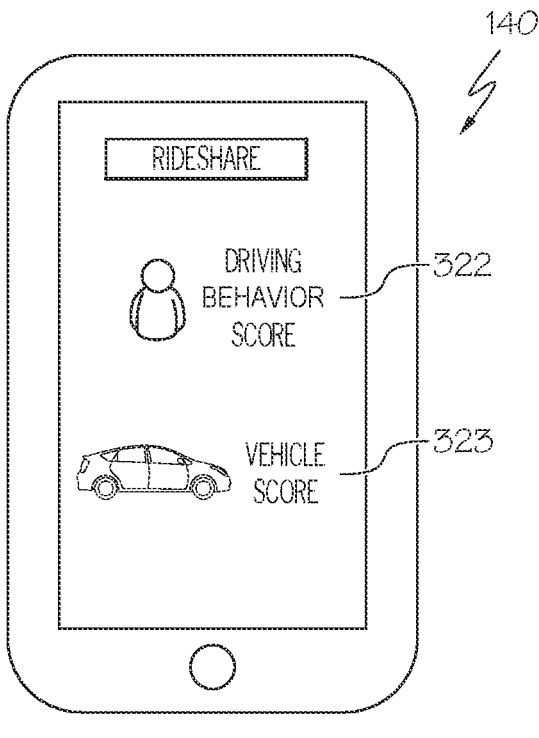
FIG. 6A depicts a user device for providing a driving behavior score and/or vehicle score for a rideshare vehicle according to one or more embodiments shown and described herein.
Figure 6B:
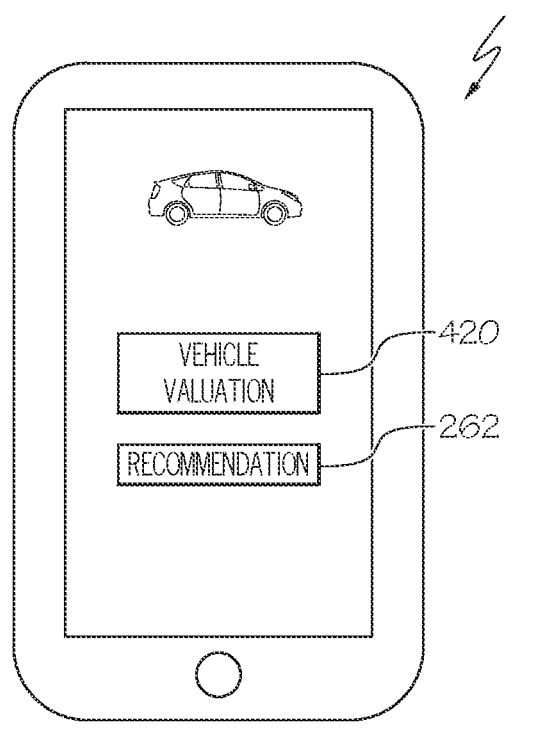
FIG. 6B depicts a user device for providing the vehicle valuation depicted and described with reference to FIG. 4 and a plurality of recommendations according to one or more embodiments shown and described herein.

At block 270, the computing device 130 generates a human interpretable version of the recommendation 262 and causes it to be provided to a user through a user device 140. The user device 140, as described above, may be a vehicle head unit, or a mobile device that is associated with the vehicle. For example, the recommendation 262 may be displayed through an application, webpage, or other communication, as described in further detail below and as depicted in FIG. 6B.

Figure 3:
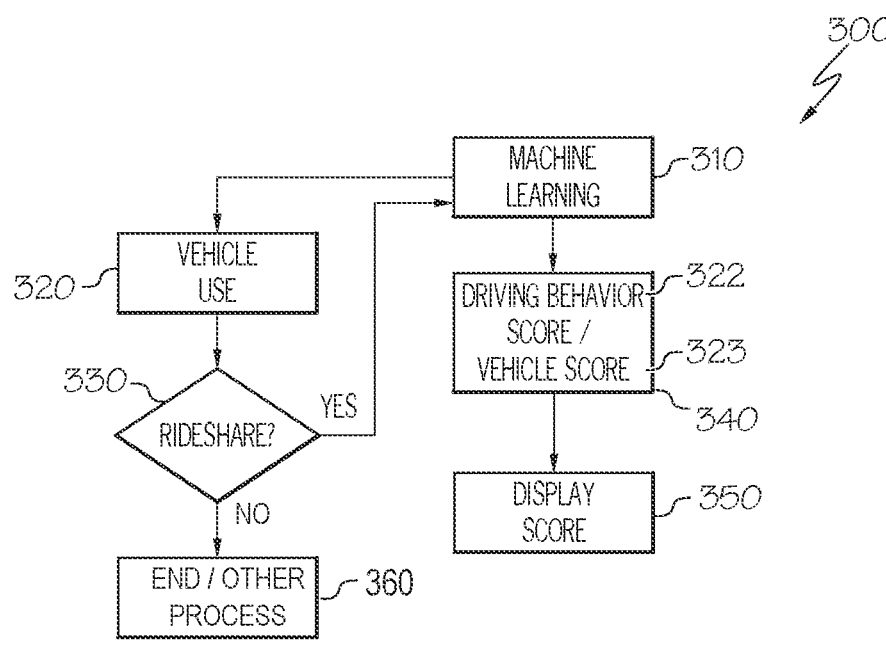
FIG. 3 depicts a flowchart of an example method for determining and displaying a driving behavior score and/or a vehicle score in a vehicle rideshare according to one or more embodiments shown and described herein.

Now referring to FIG. 3, a flowchart of an example method 300 for determining a driving behavior score 322 and/or a vehicle score 323 for a vehicle rideshare is depicted. In some embodiments, the machine-learning model 122, at block 310 is further trained to predict a vehicle use 332 and provide a driving behavior score 322 and a vehicle score 323. In such embodiments, the machine-learning model 122 is trained using the driving behavior data 107 to determine a driving behavior score 322. More specifically, the machine-learning model 122 may be trained to recognize patterns consistent with rideshare behaviors. For example, the vehicle data 150 includes start and stop events, location information of the vehicle and the number of passengers that are present in the vehicle before and after start and stop events, for example indicating when passengers enter and exit the vehicle. Additionally, when the driver does not exit with other passengers and start and stop locations irregularly change, patterns indicative of rideshare behavior can develop and are learnable by the machine-learning model 122. Accordingly, the machine-learning model 122 can be trained to predict when a vehicle is being utilized as a rideshare vehicle. At block 320, the machine-learning model 122 predicts the current usage of the vehicle. In embodiments, the vehicle use 332 may be for personal transportation, commercial transportation, recreational use, emergency services, agricultural use, industrial use, military use, public transportation, racing, rideshares, or the like.

Further, at block 330, the processor 124, 132 determines if the vehicle is used as a rideshare vehicle. If the vehicle use 332 is determined to be a rideshare, "YES" at block 330, the process returns to block 310. Upon returning to block 310 with the indication that the vehicle use 332 is a rideshare, vehicle data 150 and driving behavior data 107 associated with rideshare events can be filtered out and utilized by the machine-learning model 122 to predict a driving behavior score 322 and a vehicle score 323 that corresponds to the rideshare activity. It is understood that similar filtering processes can be implemented for other vehicle use scenarios such that a driving behavior score 322 and a vehicle score 323 that corresponds to a particular vehicle use can be generated by the machine-learning model 122.

At block 340, the generated driving behavior score 322 and the vehicle score 323 corresponding to the rideshare activity is compiled by the computing device 130. The driving behavior score 322 may include a plurality of predefined categories including an aggressiveness score, a fuel economy score, a service timeliness score, or the like.

As previously noted, at block 340, the driving behavior score 322 and the vehicle score 323 are determined by the machine-learning model 122. The scores may be indicative of how hard the vehicle 100 is driven, how well the vehicle 100 is maintained, and whether the vehicle 100 is in good condition (e.g., whether involved in accidents or exposed to environmental incidents such as floods, hail, excessive salt from winter weather or the like). In some embodiments, the vehicle use determination is fed into the machine-learning model 122 for generation of a vehicle valuation 420. For example, if the vehicle is used frequency as a ride-share or commercial vehicle, more wear and tear will be applied to the vehicle 100. At block 350, the computing device causes the driving behavior score 322 and the vehicle score 323 to displayed to a user of the rideshare vehicle through a user device 140, for example as depicted in FIG. 6A. In these embodiments, the user of the ride share will be able to select a vehicle 100 that meets a desired vehicle score (quality of maintenance) and quality of driver based on the driving behavior score 322. If the vehicle use 332 is not determined to be a rideshare, "NO" at block 330, the process ends or proceeds to another process of determining a driving behavior tailored to another vehicle use 332, at block 360.

Figure 4:
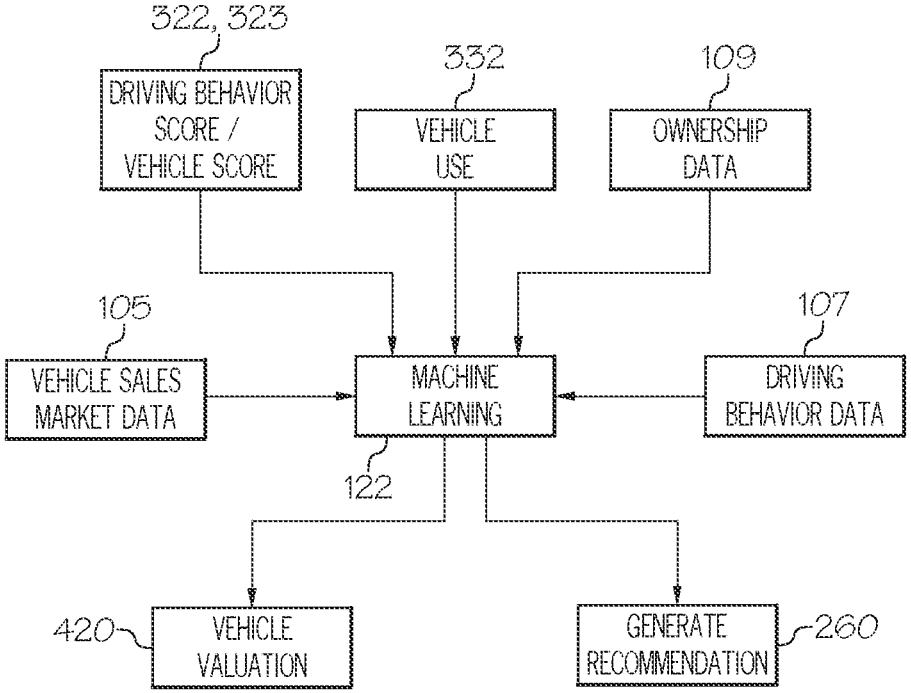
FIG. 4 schematically depicts an illustrative machine-learning model for a providing a vehicle valuation in a vehicle marketplace system according to one or more embodiments shown and described herein.

Turning to FIG. 4 an illustrative schematic of a machine-learning model 122 for a providing a vehicle valuation 420 in a vehicle marketplace system and generating a recommendation 262 as discussed herein with reference to FIG. 2 is depicted. The machine-learning model 122 ingests the vehicle sales market data 105, the driving behavior data 107 (e.g., which includes vehicle data 150), the ownership data 109 related to ownership of the vehicle 100 (e.g., the user's current vehicle 100), the vehicle use 332 determination, a driving behavior score 322 associated with the user's current vehicle 100 and a vehicle score 323 associated with the user's current vehicle 100. In response to the ingested data and vehicle use 332 determinations, the machine-learning model 122 then predicts a vehicle valuation 420. The vehicle valuation 420 may be a real-time value of the user's vehicle 100.

The vehicle valuation 420 may let the user know how much their vehicle 100 is valued at to be able to make a decision based on the recommendation 262. For example, if the recommendation 262 is for a new or used vehicle, knowing how much the user's real-time worth of their vehicle 100 may allow the user to make an educated decision on purchasing the new or used vehicle. Further, the vehicle valuation 420 may allow the user to make changes to various driving habits that may lower the vehicle valuation 420. For example, if a driver uses heavy breaking, the valuation may decrease. In embodiments, the vehicle valuation 420 may also be used by users of the system other than the owner of the vehicle. For example, potential buyers, dealers, or renters.

Furthermore, the machine-learning model 122 is configured to generate a recommendation 262 of a vehicle for purchase or lease that corresponds to a driver's driving behavior of their current vehicle 100. Over time a user's need for a vehicle can change. A vehicle needed for only commuting to work may later be needed to transport family members or others on a regular basis, tow equipment, or the like. Additionally, a user's driving behavior may change or may not have initial align with the capabilities of the vehicle they drive. Accordingly, the machine-learning model 122 is trained to learn patterns such as a driving behavior of a driver from data from vehicle sensor 152. The machine-learning model 122 may then determine, based on ownership data 109, whether a different vehicle from the vehicle 100 they user currently owns or operates can better meet their driving needs. In some embodiments, mapping determined driving behaviors of a user to specifications of new or used vehicles provided in the vehicle sales market data 105 are used to generate a recommendation 262 of a vehicle for purchase or lease that corresponds to a driver's driving behavior of their current vehicle 100. It should be understood that although a machine-learning model 122 (e.g., one model) has been referenced herein, embodiments of the present disclosure may utilize more than one machine-learning model 122, where each model is trained to make specific determinations and/or predictions described herein.

Now referring to FIGS. 5A and 5B, FIG. 5A illustrates a chart 500 of recommendations 262 based on associated driving behavior scores 322 and ownership data 109. In the example, the machine-learning model 122 outputs the driving behavior score 322. Additionally, the driving behavior score 322 can be compared to a predetermined threshold. That is, a driving behavior score 322 that is above the predetermined threshold, indicates that the driver, for example, may not obey traffic rules, occasionally or frequently accelerates or brakes aggressively, and otherwise drives their current vehicle outside of its specified operational parameters. An example of driving the vehicle 100 outside its specific operational parameters may include loading the vehicle beyond a specified weight capacity, accelerating or attempting to accelerate the vehicle 100 to high RPMs, that is pushing the capabilities of the engine and powertrain beyond their operating range. Conversely, a driving behavior score 322 that is below the predetermined threshold, indicates that the driver, for example, obeys traffic rules, does not accelerate or brake aggressively, and otherwise drives their current vehicle 100 within its specified operational parameters.

If the driving behavior score 322 is above the predetermined threshold, and the ownership data 109 shows the vehicle 100 is owned by the user, the system may provide a recommendation 262 for purchase of a new vehicle and provide a specification for the new vehicle. In such an example, the driving behavior score 322 may indicate the vehicle 100 has been driven within specified operational parameters, as such the vehicle valuation 420 will be higher than a vehicle 100 driven hard (e.g., beyond specified operational parameters). If the driving behavior score 322 is less than the predetermined threshold, and the user owns the vehicle 100, the system may provide a recommendation 262 for services on the vehicle 100.

Additionally, if the driving behavior score 322 is above the predetermined threshold and the ownership data 109 indicates the vehicle 100 is leased, the system may provide a recommendation 262 for a new lease of a new vehicle. In such an example, the vehicle may be driven gently, therefore having a higher vehicle valuation 420. The dealership may therefore want the vehicle returned for another lease. For example, such a recommendation may be driven by the need to repurpose an owner's current vehicle for another use such as integration as part of a fleet of shared vehicle or return and resale of the vehicle as a certified pre-owned vehicle for sale. On the other hand, if the driving behavior score 322 is below a predetermined threshold, this may indicate the vehicle valuation 420 is lower and the system may recommend for the lessor to purchase the vehicle 100. In such an instance, having the current lessor obtain full ownership of their vehicle might be most valuable future usage of the vehicle 100. The recommendation may tailor a purchase offer such that the lessor is encouraged to obtain full ownership of the vehicle 100 instead of ending the lease and returning the vehicle to the dealer or make a private sale.

Turning to FIG. 5B an illustrative chart 501 depicting certification 510 determinations based on the vehicle score

323. It is noted that the vehicle score 323 is similar to the driving behavior score 322, however, the vehicle score 323 is driver agnostic (e.g., may be generated based on multiple different drivers operating the vehicle 100). In the system, if the vehicle score 323 is above a predetermined threshold (e.g., which is similarly configured as described with reference to FIG. 5A hereinabove), the system may certify the vehicle 100 as being in a good condition for sale. In contrast, if the vehicle score 323 is below a predetermined threshold, the vehicle may not be in a great condition and the system does not certify the vehicle 100.

Other examples of recommendations 262 provided to a user may include a purchase of a new or used vehicle with a capability of higher acceleration based on an aggressiveness score from the driving behavior score 322, a purchase of a new or used vehicle with four-wheel drive if historical location data provided by vehicle sensors 152 include cold weather locations, an extended warranty may be offered if driving behavior data 107 and ownership data 109 indicates the vehicle is well taken care of and driven within the intended use, or the like.

Referring now to FIGS. 6A and 6B, depict illustrative embodiments of a user device 140. FIG. 6A depicts a user device displaying the driving behavior score 322 and the vehicle score 323 for a rideshare vehicle. In embodiments, this information may be displayed to a user of the rideshare in order to feel comfortable when taking a rideshare vehicle. The user will be able to determine if the vehicle 100 is well maintained from the vehicle score 323 and how a driver drives from the driving behavior score 322. For example, if the driver is a quality, rule-abiding driver. Additionally, in some embodiments, the rideshare company may use the driving behavior score 322 and vehicle score 323 to evaluate the drivers.

FIG. 6B shows a display of the vehicle valuation 420 of FIG. 4 and a plurality of recommendations 262 on a user device 140. As described above, the user may use the vehicle valuation 420 to make a decision in regards to the provided recommendations 262. In embodiments, the real-time vehicle valuation 420 of the vehicle 100 may show changes if the user accepts a recommendation 262 to add a service to the vehicle 100, drive easier, or trade in the vehicle 100 for a purchase of a new or used vehicle.

It should now be understood that embodiments described herein are directed to systems and methods of providing messages through a vehicle head unit or a user device containing recommendations based on vehicle and market data to encourage participation in the vehicle marketplace. The systems and methods implement a machine-learning model that is configured to learn with ingested information including driving behavior data, ownership data, and market data and provide recommendations for the purchase of a vehicle, the lease of a vehicle, or other services for the vehicle. The machine-learning model incorporates market data in the analysis, including hundreds of disparate data points such as environmental information pertaining to where the vehicle was stored and operated, driving behavior data pertaining to how the vehicle was driven, service and maintenance data, and the like. This allows the model to generate a vehicle valuation and make recommendations to the user in the vehicle marketplace.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for generating recommendations of a vehicle corresponding to a driver's driving behavior, the method comprising:

receiving, with one or more processors communicatively coupled to a vehicle, driving behavior data of the vehicle generated from vehicle sensors, wherein the driving behavior data is generated from a plurality of drivers that operated the vehicle;

receiving data related to ownership of the vehicle;

receiving vehicle sales market data;

generating, using a trained machine-learning model implemented by the one or more processors, based on the vehicle sales market data, the driving behavior data, and the data related to ownership of the vehicle, an asset valuation;

generating, with the trained machine-learning model, a recommendation to a user based on the asset valuation and the driving behavior data, wherein the recommendation comprises a new or used vehicle for purchase or leasing, and the new or used vehicle is a different vehicle from the vehicle; and providing the recommendation to a user though a user device.

2. The method of claim 1, wherein the recommendation defines whether the new or used vehicle is a truck, an SUV, a sedan, or a hybrid vehicle.

3. The method of claim 1, wherein:

the trained machine-learning model is further trained to analyze the driving behavior data and determine a driving behavior score for a plurality of predefined categories, wherein the plurality of predefined categories include an aggressiveness score, a fuel economy score, a service timeliness score, and wherein the recommendation is further based on the driving behavior score.

4. The method of claim 3, wherein:

the driving behavior data includes acceleration data, the acceleration data indicate that the aggressiveness score is above a predetermined threshold, and the recommendation comprises a recommendation for a purchase of a vehicle with a higher acceleration than a user's current vehicle when the aggressiveness score is above the predetermined threshold.

5. The method of claim 3, wherein:

the driving behavior data includes an indication of a number of occupants in a vehicle and a frequency of the number of occupants, the trained machine-learning model is further trained to predict, based on the driving behavior data and the data related to ownership of the vehicle, a vehicle use type, the vehicle use type indicating that the vehicle is a rideshare vehicle, and the method further comprising displaying the driving behavior score to a user of the rideshare vehicle.

6. The method of claim 3, wherein:

the trained machine-learning model is further configured to generate a valuation of the vehicle based on the vehicle sales market data, the driving behavior data, the data related to ownership of the vehicle, and the driving behavior score, and the method further comprising providing to the user the valuation with the recommendation though the user device.

7. The method of claim 1, further comprising:

generating, using the trained machine-learning model, a vehicle score based on the driving behavior data and the data related to the ownership of the vehicle, and certifying the vehicle in response to the vehicle score being greater than a predetermined threshold.

8. The method of claim 1, wherein the driving behavior data indicates that the vehicle operated outside of a specified set of operational parameters; and the asset valuation is lower when the driving behavior data indicates that the vehicle operated outside of the specified set of operational parameters compared to when the driving behavior data indicates that the vehicle operated within the specified set of operational parameters.

9. A system comprising:

a computing device having a processor and a non-transitory computer readable memory;

a transceiver unit communicatively coupled to the computing device; and a machine-readable instruction set stored in the non-transitory computer readable memory that causes the system to perform at least the following when executed by the processor:

receive driving behavior data of a vehicle generated from vehicle sensors, wherein the driving behavior data is generated from a plurality of drivers that operated the vehicle;

receive data related to ownership of the vehicle;

receive vehicle sales market data;

generate, using a trained machine-learning model implemented by the processor, based on the vehicle sales market data, the driving behavior data, and the data related to ownership of the vehicle, an asset valuation;

generate, with the trained machine-learning model, a recommendation to a user based on the asset valuation and the driving behavior data, wherein the recommendation comprises a new or used vehicle for purchase or leasing, and the new or used vehicle is a different vehicle from the vehicle; and provide the recommendation to a user though a user device.

10. The system of claim 9, wherein:

the trained machine-learning model is further trained to analyze the driving behavior data and determine a driving behavior score for a plurality of predefined categories, wherein the plurality of predefined categories include an aggressiveness score, a fuel economy score, a service timeliness score, and wherein the recommendation is further based on the driving behavior score.

11. The system of claim 10, wherein:

the driving behavior data includes acceleration data, the acceleration data indicate that the aggressiveness score is above a predetermined threshold, and the recommendation comprises a recommendation for a purchase of a vehicle with a higher acceleration than a user's current vehicle when the aggressiveness score is above the predetermined threshold.

12. The system of claim 10, wherein:

the driving behavior data includes an indication of a number of occupants in a vehicle and a frequency of the number of occupants, the trained machine-learning model is further trained to predict, based on the driving behavior data and the data related to ownership of the vehicle, a vehicle use type, the vehicle use type indicating that the vehicle is a rideshare vehicle, and the machine-readable instruction set, when executed, further causes the system to display the driving behavior score to a user of the rideshare vehicle.

13. The system of claim 10, wherein:

the trained machine-learning model is further configured to generate a valuation of the vehicle based on the vehicle sales market data, the driving behavior data, the data related to ownership of the vehicle, and the driving behavior score, and wherein the machine-readable instruction set, when executed, further causes the system to provide to the user the valuation with the recommendation though the user device.

14. The system of claim 9, the machine-readable instruction set, when executed, further causes the system to:

generate, using the trained machine-learning model, a vehicle score based on the driving behavior data and the data related to the ownership of the vehicle, and certify the vehicle in response to the vehicle score being greater than a predetermined threshold.

15. A vehicle comprising:

a computing device of a vehicle comprising a processor and a non-transitory computer readable memory;

a transceiver unit communicatively coupled to the computing device; and a machine-readable instruction set stored in the non-transitory computer readable memory that causes the vehicle to perform at least the following when executed by the processor:

receive driving behavior data of the vehicle generated from vehicle sensors, wherein the driving behavior data is generated from a plurality of drivers that operated the vehicle;

receive data related to ownership of the vehicle;

receive vehicle sales market data;

generate, using a trained machine-learning model implemented by the processor, based on the vehicle sales market data, the driving behavior data, and the data related to ownership of the vehicle, an asset valuation;

generate, with the trained machine-learning model, a recommendation to a user based on the asset valuation and the driving behavior data, wherein the recommendation comprises a new or used vehicle for purchase or leasing, and the new or used vehicle is a different vehicle from the vehicle; and provide the recommendation to a user though a user device.

16. The vehicle of claim 15, wherein, the trained machine-learning model is further trained to analyze the driving behavior data and determine a driving behavior score for a plurality of predefined categories, wherein the plurality of predefined categories include an aggressiveness score, a fuel economy score, a service timeliness score, and wherein the recommendation is further based on the driving behavior score.

17. The vehicle of claim 16, wherein, the driving behavior data includes an indication of a number of occupants in a vehicle and a frequency of the number of occupants, the trained machine-learning model is further trained to predict, based on the driving behavior data and the data related to ownership of the vehicle, a vehicle use type, the vehicle use type indicating that the vehicle is a rideshare vehicle, and the machine-readable instruction set, when executed, further causes display of the driving behavior score to a user of the rideshare vehicle.

18. The vehicle of claim 16, wherein, the trained machine-learning model is further configured to generate a valuation of the vehicle based on the vehicle sales market data, the driving behavior data, the data related to ownership of the vehicle, and the driving behavior score, and wherein the machine-readable instruction set, when executed, further causes the vehicle to provide to the user the valuation with the recommendation though the user device.

19. The vehicle of claim 15, wherein the machine-readable instruction set, when executed, further causes the vehicle to:

generate, using the trained machine-learning model, a vehicle score based on the driving behavior data and the data related to the ownership of the vehicle, and certify the vehicle in response to the vehicle score being greater than a predetermined threshold.

* * * * *